United States Patent
Kishima et al.

(10) Patent No.: US 6,773,868 B2
(45) Date of Patent: Aug. 10, 2004

(54) METHOD FOR PRODUCING RECORDING MEDIUM, METHOD FOR PRODUCING STAMPER OF RECORDING MEDIUM, APPARATUS FOR PRODUCING RECORDING MEDIUM, AND APPARATUS FOR PRODUCING STAMPER OF RECORDING MEDIUM

(75) Inventors: Koichiro Kishima, Tokyo (JP); Akira Kouchiyama, Tokyo (JP)

(73) Assignee: Sony Corporation (JP)

( * ) Notice: Subject to any disclaimer, the term of this patent is extended or adjusted under 35 U.S.C. 154(b) by 136 days.

(21) Appl. No.: 09/959,646

(22) PCT Filed: Mar. 2, 2001

(86) PCT No.: PCT/JP01/01653
§ 371 (c)(1),
(2), (4) Date: Feb. 19, 2002

(87) PCT Pub. No.: WO01/65553
PCT Pub. Date: Mar. 2, 2000

(65) Prior Publication Data
US 2003/0013040 A1 Jan. 16, 2003

(30) Foreign Application Priority Data
Mar. 2, 2000 (JP) .................................. 2000-057372

(51) Int. Cl.$^7$ .............................................. G11B 7/24
(52) U.S. Cl. ....................... 430/320; 430/321; 369/284; 369/116; 369/14
(58) Field of Search ............................ 430/320, 321, 430/326; 369/284, 275.4, 116, 14

(56) References Cited

U.S. PATENT DOCUMENTS 3,959,799 A  *  5/1976 Gambino et al. ........... 430/524
4,278,734 A  *  7/1981 Ohta et al. .................. 428/432
4,845,515 A  *  7/1989 Suh ............................ 327/484

(List continued on next page.)

FOREIGN PATENT DOCUMENTS

| EP | 0884721 | * 12/1998 |
| JP | 55-072009 | * 6/1979 |
| JP | 58-057644 | * 4/1983 |
| JP | 04-311835 | * 11/1992 |
| JP | 05-151572 | * 6/1993 |

(List continued on next page.)

OTHER PUBLICATIONS

Keizer, "Videodisc Mastering", RCA Review vol. 39(1) pp. 60–86 (Mar. 1978).*
Osato et al., "A rewriatble optical disk systme with over 10GB of capacity", Proc. SPIE vol. 3401, pp. 80–86 (May 1988).*
Office Action Aug. 21, 20002 in correspondence with the TW application.

*Primary Examiner*—Martin J Angebranndt
(74) *Attorney, Agent, or Firm*—Rader, Fishman & Grauer PLLC; Ronald P. Kananen (57) ABSTRACT

A recording medium manufacturing method comprises a process for forming a thermosensitive material layer 12 on a substrate comprising a recording medium or a recording medium manufacturing master, a process for forming a denatured portion 12s of a pattern corresponding to target very small concavities and convexities on the thermosensitive material layer by irradiating laser light on the thermosensitive material layer with patterns corresponding to target very small concavities and convexities and a process for forming target very small concavities and convexities by patterning the thermosensitive material layer by developing the thermosensitive material layer 12. In particular, in the laser light irradiation, there can be formed patterns independent of the length of the very small concavities and convexities by irradiation of laser light modulated by a frequency higher than a period of very small concavities and convexities.

7 Claims, 7 Drawing Sheets

U.S. PATENT DOCUMENTS

| | | | | |
|---|---|---|---|---|
| 5,040,165 A | * | 8/1991 | Taii et al. | 369/275.4 |
| 5,084,856 A | * | 1/1992 | Henmi et al. | 369/116 |
| 5,291,470 A | | 3/1994 | Nishiuchi et al. | 369/100 |
| 5,459,018 A | * | 10/1995 | Akahira | 430/270.12 |
| 5,592,322 A | | 1/1997 | Kim | 369/116 |
| 5,807,640 A | * | 9/1998 | Ueno et al. | 428/64.1 |
| 5,818,808 A | | 10/1998 | Takada et al. | 369/116 |
| 5,979,772 A | * | 11/1999 | Takei et al. | 235/487 |
| 6,030,556 A | * | 2/2000 | DePuydt et al. | 264/1.37 |
| 6,385,638 B1 | * | 5/2002 | Baker-Harvey | 709/107 |

FOREIGN PATENT DOCUMENTS

| | | | |
|---|---|---|---|
| JP | 06-171236 | * | 6/1994 |
| JP | 09-035269 | * | 2/1997 |
| JP | 09-161298 | * | 6/1997 |
| JP | 11-265509 | * | 9/1999 |

* cited by examiner

SPOT MOVING DIRECTION

FIG. 3A (DATA PATTERN)

FIG. 3B (LASER LIGHT IRRADIATION PATTERN)

FIG. 3C (LASER LIGHT IRRADIATION PATTERN)

FIG. 3D (VERY SMALL CONCAVE AND CONVEX PATTERN)

METHOD FOR PRODUCING RECORDING MEDIUM, METHOD FOR PRODUCING STAMPER OF RECORDING MEDIUM, APPARATUS FOR PRODUCING RECORDING MEDIUM, AND APPARATUS FOR PRODUCING STAMPER OF RECORDING MEDIUM

TECHNICAL FIELD

The present invention relates to a method of manufacturing a recording medium in which very small concavities and convexities such as pits comprising recording marks or grooves are formed, a method of manufacturing a recording medium manufacturing master, an apparatus for manufacturing a recording medium and an apparatus for manufacturing a recording medium manufacturing master, for example.

The above-mentioned master is a stamper itself for molding a recording medium having very small concavities and convexities formed thereon by injection molding or 2P method (Photopolymerization method), a master for manufacturing a so-called master used to transfer and duplicate a plurality of stampers and a master such as a so-called mother master used to transfer and duplicate a plurality of masters, for example.

BACKGROUND ART

In recent years, there is an increasing demand for increasing a recording density.

In recent years, in an optical pickup for reproducing a recording medium, there is proposed a so-called near-field arrangement in which a distance between a recording medium and an optical lens is selected to be under 200 nm. According to this arrangement, an N. A (numerical aperture) of an optical lens system can be increased and a diameter of a beam spot can be reduced by using reproducing laser light having a short wavelength, i.e., violet laser light, whereby a track pitch can be reduced and a width and a length of a recording mark can be reduced. Thus, a recording density can be improved more.

A diameter of a beam spot of reproducing light is generally selected to be about twice the width of the recording mark in order that the recording mark can be read out from the optical disk with a high reliability. In other words, the recording mark formed on the recording medium should preferably be selected to be under ½ of a diameter of a minimum beam spot that can be formed by reproducing light.

Figure 8:
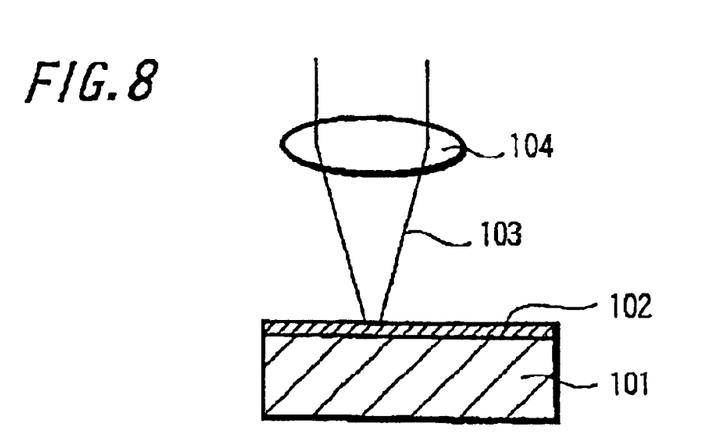
FIG. 8 is a schematic cross-sectional view to which reference will be made in explaining a method of manufacturing a master, for example, by using a photosensitive material according to the prior art.

Currently, in the manufacturing process of the recording medium, e.g., in the manufacturing process of the master, for example, in general, as shown in a schematic cross-sectional view of FIG. 8, a photosensitive material layer 102 is formed on a substrate 101 comprising a master, e.g., glass substrate by spin coating. Laser light 103 is focused on this photosensitive material layer 102 by a condenser lens 104 and irradiated on the photosensitive material layer in response to desired data that should be recorded, for example. Thereafter, when this photosensitive material layer 102 is developed, the patterning of the photosensitive material layer 102 is effected by removing the area which had been reacted in photosensitivity with irradiation of laser light, for example. Then, very small concavities and convexities corresponding to recording data are formed by etching the substrate 101 while this photosensitive material layer is being used as a mask.

Figure 9:
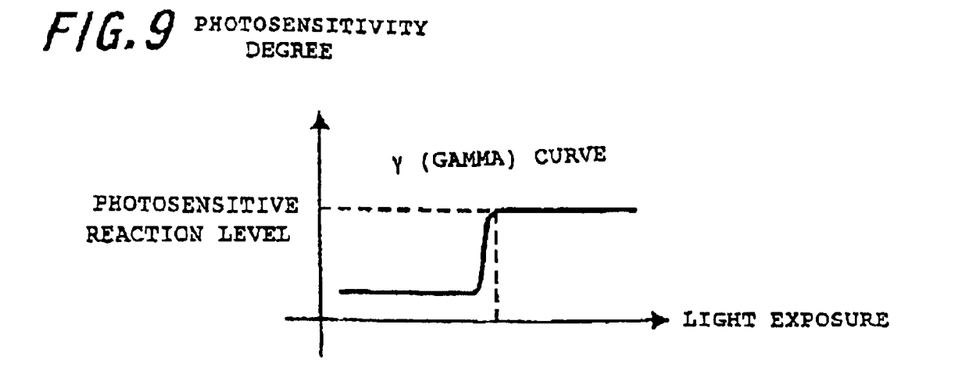
FIG. 9 is a diagram showing a γ (gamma) curve of a photosensitive material.
Figure 10A:
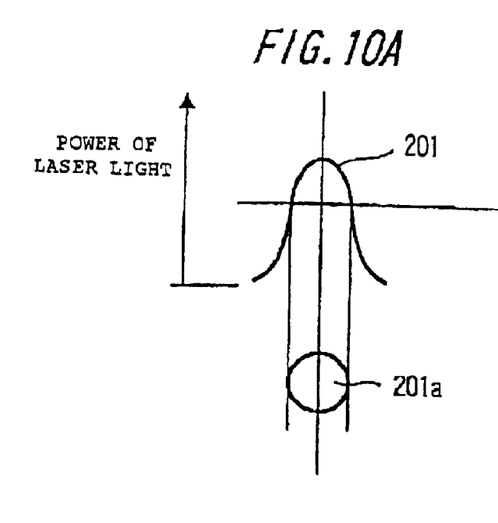
FIGS. 10A and 10B are respectively diagrams showing a relationship between a laser light power distribution and an exposed and reacted area.
Figure 10B:
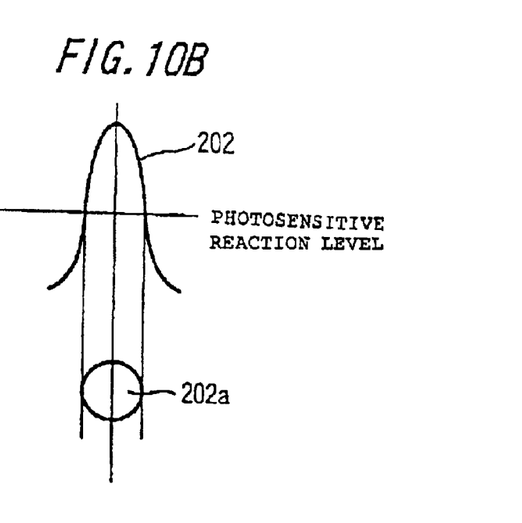

As shown by an example of a γ (gamma) curve in FIG. 9, a characteristic of a photosensitive material has a characteristic which is exposed and reacted rapidly, i.e., which is exposed and reacted substantially stepwise in a light exposure greater than a certain light exposure. Therefore, when the photosensitive material is exposed by laser light having a laser light power distribution of a curve 202, in FIG. 10B, having power larger than this power as compared with a case in which this photosensitive material is exposed by laser light having a laser light power distribution shown by a curve 202 shown in FIG. 10A, a substantial photosensitive reaction area in the photosensitive material layer 102 is widened to a certain extent but this widened photosensitive reaction area does not lead to the area corresponding to exposure power.

Figure 11A:
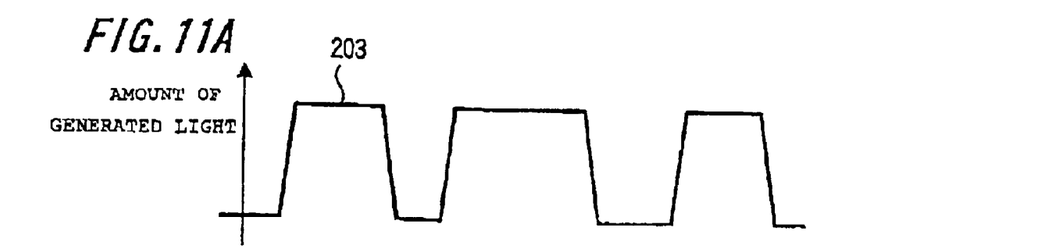
FIG. 11A is a laser light pattern diagram.
Figure 11B:
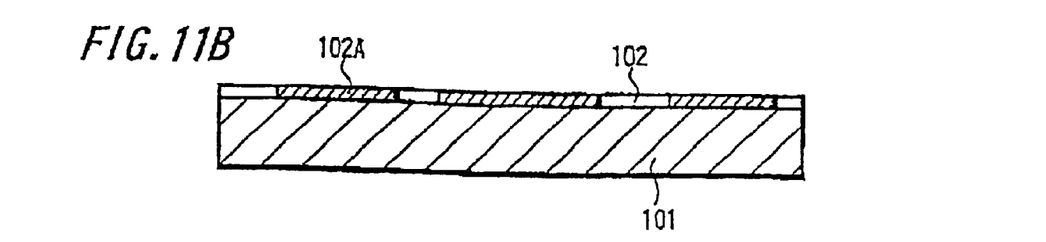
FIG. 11B is an exposure pattern diagram and FIG. 11C is a pattern diagram of concave portions.
Figure 11C:
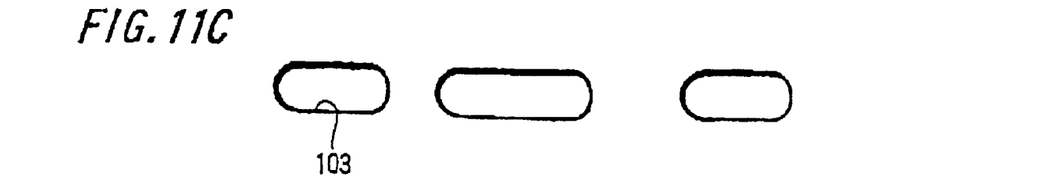

Accordingly, in the above process for manufacturing the recording medium manufacturing matter, when the photosensitive material layer is exposed with a luminous pattern shown by a curve 203 in FIG. 11A, for example, while laser light spirally scans the photosensitive material layer with rotation of the above substrate 101, for example, as shown in FIG. 11B, an exposed portion 102A corresponding to a laser light irradiation pattern is formed on the photosensitive material layer 102 deposited on the substrate 101. Then, very small convexities and concavities formed after this exposed portion, for example, had been removed by development and the substrate 101 had been etched by using this photosensitive material layer 102 as an etching mask are formed as stable patterns as shown by a plan view of concave portions 103 formed as recording marks, for example, in FIG. 11C.

However, in this case, the very small concavities and convexities formed by pattern-exposing this photosensitive material layer are substantially determined by a diameter of a spot of laser light for use in exposure so that very small convexities and concavities which are over an optical limit cannot be formed. Accordingly, even when a diameter of a beam spot of reproducing laser light, for example, is reduced as much as possible, a width of recording mark cannot be reduced under ½ of the diameter of the beam spot of this reproducing laser light.

Although an electron beam writing apparatus and the like are developed as a pattern exposure apparatus for photosensitive material layers as an aide to form very small patterns and to increase a density, this electron beam writing apparatus has to execute writing in the high vacuum atmosphere. There then arises a problem that this apparatus becomes large in size and expensive.

It is an object of the present invention to provide a method of manufacturing a recording medium and a method of manufacturing a recording medium manufacturing master in which very small concavities and convexities having widths or track pitches sufficiently smaller than a beam spot of an optical limit of laser light used to form very small concavities and convexities can be formed independently of lengths of very small concavities and convexities.

Further, it is another object of the present invention to provide an apparatus for manufacturing a recording medium and an apparatus for manufacturing a recording medium manufacturing master having simple structures and which can be constructed as sufficiently small apparatus as compared with the above electron beam writing apparatus.

DISCLOSURE OF INVENTION

In a method of manufacturing a recording medium having very small concavities and convexities, a recording medium manufacturing method according to the present invention is comprised of a process for forming a thermosensitive material layer on a substrate comprising a recording medium, a process for forming a denatured portion with patterns corresponding to target very small concavities and convexities on the thermosensitive material layer by irradiating laser light on this thermosensitive material layer with patterns corresponding to the target very small concavities and convexities and a process for patterning this thermosensitive material layer by developing this thermosensitive material layer. Then, in particular, according to the present invention, pattern irradiation of laser light is executed by irradiation of laser light modulated by a frequency higher than a period of the target very small concave and convex patterns.

A method of manufacturing a recording medium manufacturing master according to the present invention is a method of manufacturing a recording medium manufacturing master for manufacturing a recording medium having very small concavities and convexities. This method is comprised of a process for forming a thermosensitive material layer on a substrate comprising a recording medium, a process for forming a denatured portion with patterns corresponding to very small concavities and convexities on the thermosensitive material layer by irradiating laser light on this thermosensitive material layer with patterns corresponding to very small concave and convex patterns and a process for patterning the thermosensitive material layer by developing the thermosensitive material layer. Then, in particular, according to the present invention, pattern irradiation of laser light is executed by irradiation of laser light modulated by a frequency higher than a period of target very small concave and convex patterns.

A recording medium manufacturing apparatus according to the present invention is an apparatus for manufacturing a recording medium having very small concavities and convexities and is comprised of a holding means for holding a substrate comprising a recording medium in which a thermosensitive material layer is deposited at least on one major surface, a laser light source section, a modulating means for modulating laser light from this laser light source section in response to patterns of very small concavities and convexities and which modulates laser light by a frequency higher than a period of patterns of very small concavities and convexities, an optical system including a condenser lens system for focusing laser light on the thermosensitive material layer and a moving means for moving the irradiation position of laser light relative to the thermosensitive material layer.

Further, an apparatus for manufacturing a recording, medium manufacturing a maser according to the present invention is an apparatus for manufacturing a recording medium having very small concavities and convexities and is comprised of a holding means for holding a substrate comprising a master in which a thermosensitive material layer is deposited at least on one major surface, a laser light source section, a modulating means for modulating laser light from this laser light source section in response to patterns of very small concavities and convexities and which modulates laser light by a frequency higher than a period of the patterns of the very small concavities and convexities, an optical system including a condenser lens system for focusing laser light on the thermosensitive material layer and a moving means for moving an irradiation of laser light relative to the thermosensitive material layer.

As described above, in the recording medium and the method of manufacturing the medium manufacturing master according to the present invention, unlike the conventional ordinary photosensitive material layer, the thermosensitive material layer is used and a thermally-denatured portion is formed on the thermosensitive material layer by irradiating laser light on the thermosensitive material layer. Then, this denatured portion or the portion other than this denatured portion is removed by development and the denatured portion is formed on a heated region whose width is narrower than the beam spot of the laser light by patterning. That is, there can be formed very small patterns which are under the optical limit of the beam spot of the laser light.

Further, in the recording medium and the method of manufacturing the medium manufacturing master according to the present invention, in particular, laser light which was modulated to have a frequency higher than a period of the very small concavities and convexities is irradiated. With this arrangement, the heated portion which is generated with continuous irradiation of laser light based on the length of the exposure portion, i.e., a duration of an exposure time can be prevented from being widened and the denatured portion of the accurate predetermined shape, the width and the pitch can be formed. Thus, it becomes possible to accurately form target very small patterns.

Furthermore, in the recording medium and the apparatus for manufacturing the medium manufacturing master, since processing work within the high vacuum chamber is not required, a simple and small apparatus can be constructed.

BRIEF DESCRIPTION OF DRAWINGS

FIG. 3 is a diagram to which reference will be made in explaining a laser light modulation method in a recording medium and a method of manufacturing a recording medium manufacturing a master according to the present invention, wherein

FIG. 10 is a diagram to which reference will be made in explaining a conventional method, wherein

FIG. 11 is a diagram to which reference will be made in explaining a conventional method, wherein

BEST MODE FOR CARRYING OUT THE INVENTION

Figure 1:
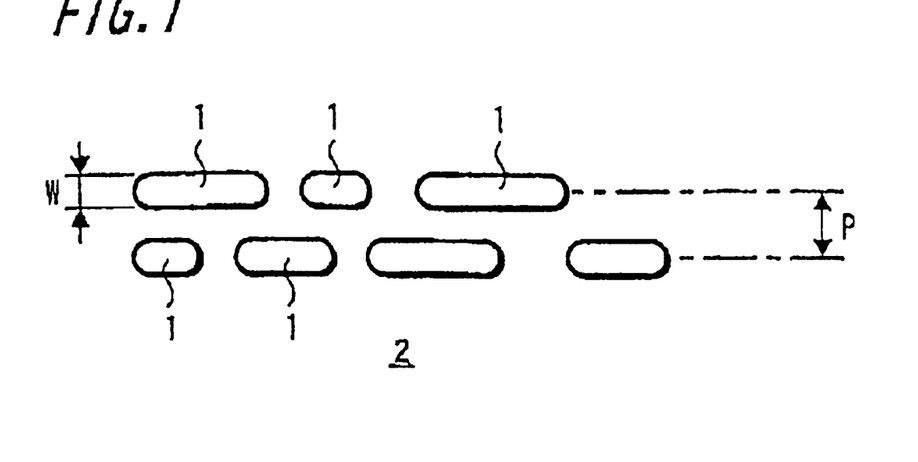
FIG. 1 is a plan view of an example of target very small concave and convex patterns obtained by a recording medium and a method of manufacturing a recording medium manufacturing master according to the present invention.

According to the recording medium manufacturing method of the present invention, as FIG. 1 shows a schematic plan view of its example, for example, there can be manufactured a recording medium in which very small concavities and convexities 2 in which concave portions or convex portions comprising recording marks 1, for example, are arrayed are formed.

In the recording medium manufacturing method according to the present invention, there is initially prepared an $SiO_2$ substrate in which a silicon oxide ($SiO_2$) layer is formed on a transparent resin substrate, for example, comprising a recording medium or a glass substrate. A thermosensitive material layer is formed on this substrate.

Laser light is irradiated on this thermosensitive material layer with a pattern corresponding to the target very small concavities and convexities, i.e., an array pattern of the recording marks 1 of FIG. 1, for example, or an inverted pattern of this pattern, whereby a denatured portion is formed on the thermosensitive material layer by a rise of temperature in a laser light irradiated portion.

Figure 2:
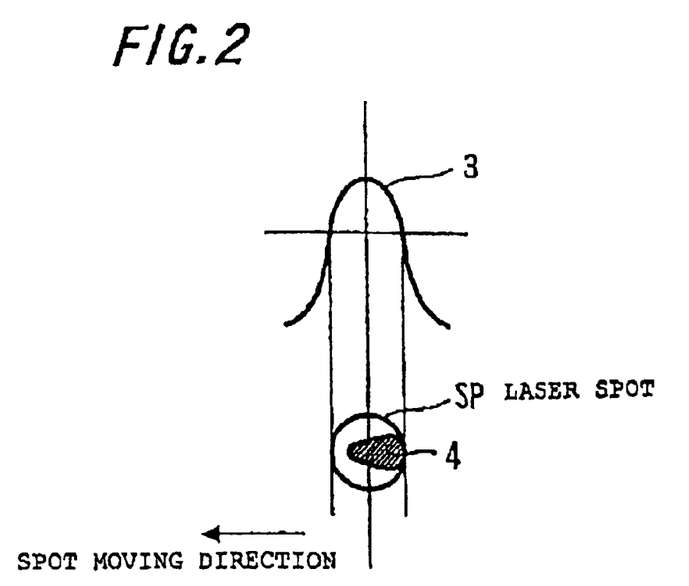
FIG. 2 is a diagram showing a relationship a laser light power distribution and a temperature rise area used in a method according to the present invention.

Assuming now that a power distribution in the beam spot of irradiated laser light is a curve 3 in FIG. 2, for example, and is a substantial laser spot SP in the thermosensitive material layer, then the denatured portion in the thermosensitive material layer, i.e., a temperature rise portion 4 becomes an area narrower than the laser spot SP. Specifically, this denatured portion can be made smaller than the laser spot. Further, the temperature rise area 4, i.e., the width of the denatured portion can be selected to be smaller by selecting laser power, for example.

This temperature rise area 4 can increase its width because its rear of the moving direction of the spot is irradiated by laser light a longer time than its front.

Figure 3A:
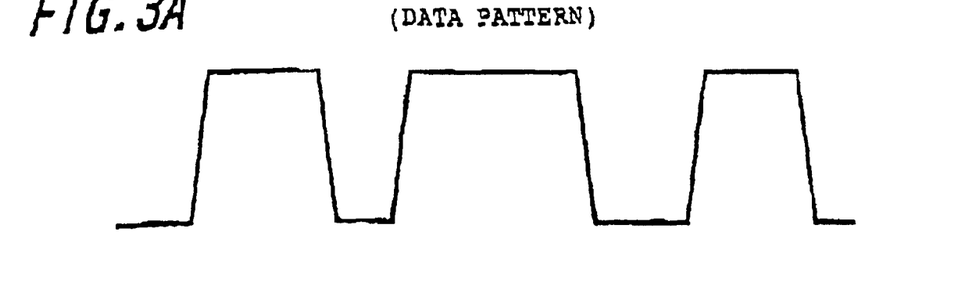
FIG. 3A shows a data pattern.
Figure 3B:
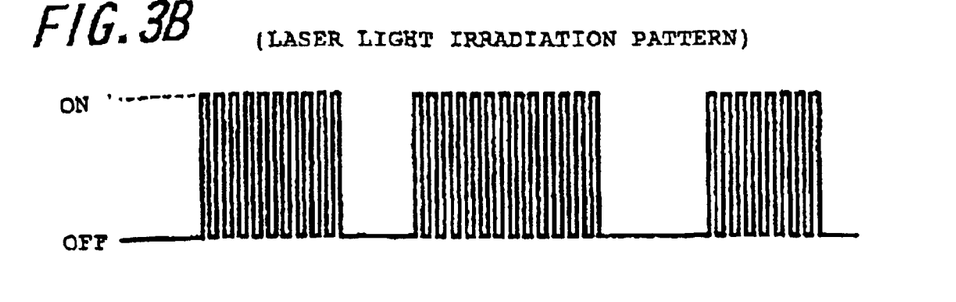
FIGS. 3B and 3C show laser light irradiation patterns and FIG. 3D shows a very small concave and convex pattern.
Figure 3C:
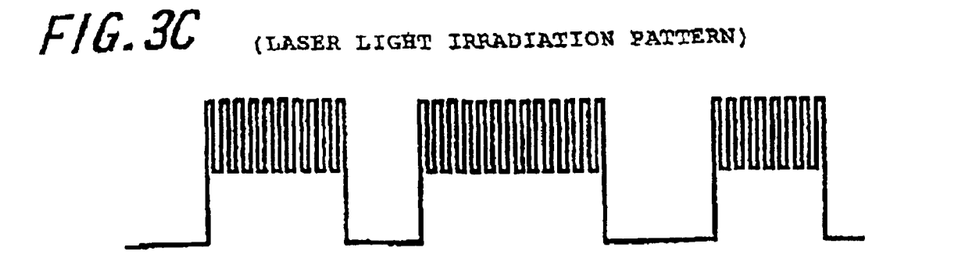

Then, laser light irradiated on this thermosensitive material layer is modulated in intensity in response to the target very small concavities and convexities. When a recording data pattern that should be recorded on the recording medium is a pattern shown in FIG. 3A, for example, laser light is modulated by a recording data signal based on this data pattern and is also modulated by a signal having a constant high frequency signal higher than the frequency of this recording data signal, e.g., several 100s of MHz as shown in FIG. 3B or 3C. Specifically, at the same time laser light having power higher than the level in which a temperature rises to denature the thermosensitive material layer is selectively irradiated on the portion in which the denatured portion is formed, laser irradiation pattern of this portion is realized by modulation of irradiating pulse laser light made by repetition of on/off of high frequency as shown in FIG. 3B or by power modulation of repeated laser light higher than certain level of power in selectively irradiation of laser light in the denatured portion forming portion.

Thereafter, this thermosensitive material layer is developed to eliminate the denatured portion or the portion which is not denatured, thereby patterning the thermosensitive material layer.

According to the above method, since the very small concavities and convexities based on this thermosensitive material layer are formed by patterning the thermosensitive material layer, this condition can provide a recording medium having very small concavities and convexities. In this case, since the depth (difference of undulations) of the very small concavities and convexities is limited in such a way as it is prescribed by the thickness of the thermosensitive material layer, while this thermosensitive material layer is being used as an etching mask, very small concavities and convexities having necessary depths can be formed by etching the substrate surface to a predetermined depth according to an RIE (reactive ion etching) based on anisotropy etching, for example.

As described above, in the recording medium manufacturing method according to the present invention, the thermosensitive material layer is used and the denatured portion is formed by irradiating laser light on the thermosensitive material layer. In this case, a width in which the denatured portion is formed on the thermosensitive material layer is formed, accordingly, the recording mark width W and the track pitch P in FIG. 1, for example, can be made narrow.

Figure 3D:
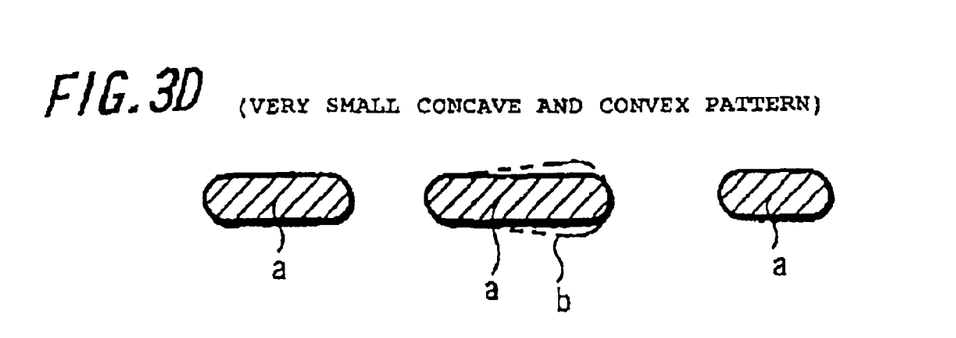

Therefore, according to this method, there can be formed smaller and high-density very small concavities and convexities In particular, according to the method of the present invention, since laser light is discontinuously irradiated or repeatedly irradiated based on intensity of power after laser light had been modulated by the high frequency shown in FIGS. 3B and 3C, the recording mark pattern thus obtained can be reliably formed with a uniform width independently of the length, for example, as shown by an area a shown hatched in FIG. 3D.

Specifically, when laser light is not modulated by a high frequency as in the present invention but laser light is modulated by only the data pattern and then irradiated, laser light is continuously irradiated on the long denatured portion for a long period of time, whereby a heated area is widened in the rear end side of the laser irradiation. Thus, as shown by dashed lines b in FIG. 3D, the width of the denatured portion is widened in the rear end of the laser irradiation portion. Specifically, the width is fluctuated depending on the length of the recording mark.

However, according to the method of the present invention, since laser irradiation is executed discontinuously or repeated by intensity of laser power after laser light had been modulated by high frequency, when the length of the mark is long, a rise of temperature can be suppressed so that the denatured portion in which dependence of the length of the length of the mark is improved can be formed, i.e., the mark pattern can be formed.

In the manufacturing method of the recording medium manufacturing master according to the present invention, as FIG. 1 shows a schematic plan view of its one example, there is manufactured a master by which a recording medium in which very small concavities and convexities 2 comprised of arrays of concavities or convexities comprising the recording mark 1, for example, is manufactured by injection molding, 2P method or the like.

This master manufacturing method, there is prepared a substrate comprising the master and a thermosensitive material layer is formed on this substrate.

Then, a denatured portion of this pattern is formed on the thermosensitive material layer by irradiating laser light on this thermosensitive material layer with a pattern corresponding to target very small concavities and convexities, i.e., pattern of concavities 1 comprising the recording mark of FIG. 1, for example, or inverted pattern of such pattern.

Also in this case, laser light modulated similarly to the description of FIG. 3 is irradiated on the thermosensitive material layer.

Thereafter, the denatured portion or the portion which is not denatured is eliminated by developing the thermosensitive material layer, whereby the thermosensitive material layer is patterned. Also in this case, as earlier noted with reference to FIG. 2, there can be formed a denatured portion narrower than the laser spot.

Also in this case, since the very small concavities and convexities are formed based on the thermosensitive material layer by patterning the thermosensitive material layer, this condition can provide a recording medium master having very small concavities and convexities. In this case, since the depth of very small concavities and convexities (difference of undulations) is restricted in such a way as it is prescribed by the thickness of the thermosensitive material layer, while this thermosensitive material layer is being used as an etching mask, very small concavities and convexities having necessary depths are formed by etching the surface of the substrate with a predetermined depth according to the RIE based on anisotropy etching, for example, thereby making it possible to manufacture the master.

These masters may be stamper or so-called master for duplicating this stamper or so-called mother master for duplicating this master and the like as has been described in the preamble of the specification of the present invention.

Also in this master manufacturing method according to the present invention, similarly to the recording medium manufacturing method, the thermosensitive material layer is used and the denatured portion is formed by irradiation of laser light, whereby smaller and highly-dense very small concavities and convexities can be formed.

Since the laser irradiation is executed discontinuously or repeated based on intensity of laser power after laser light had been modulated by the high frequency, there can be formed very small concavities and convexities in which dependence of the length of the mark length can be improved.

The thermosensitive material layer used in the above recording medium manufacturing method and the manufacturing method of the recording medium manufacturing master can be formed as a laminated structure of at least two layers or more made of materials different from each other, i.e., at least first and second material layers. Then, when a temperature rises with irradiation of laser light, these material layers are mutually diffused or dissolved, whereby a denatured portion based on mixture or reaction of two materials or more is formed.

It is desirable that the material comprising this thermosensitive material layer should be an inorganic material.

The concrete arrangement of the thermosensitive material layer is laminated structure of an Al layer and a Cu layer, a laminated structure of an Al layer and a Ge layer, a laminated structure of a Si layer and an Al layer, a laminated structure of a Ge layer and an Au layer but it is not limited to these two-layer structure and can be formed as a laminated structure of three layers or more. Further, there can be constructed a thermosensitive material layer based on a single-film structure of a metal in which heat oxidation phenomenon occurs, e.g., Ti, Ta and this thermosensitive material layer is denatured by reacting it with oxygen in the air by irradiation of laser light.

It is desirable that laser light irradiated on the thermosensitive material layer is semiconductor laser light, in particular, laser light of a GaN-based laser of violet laser light having a short wavelength (e.g., wavelength ranging from 410 nm to 390 nm).

The diameter of the spot beam of laser light can be reduced by using laser light having a short wavelength.

The thermosensitive material layer is patterned by development using tetramethyl ammonium hydroxide aqueous solution of 1 to 3%, for example.

Next, a recording medium manufacturing method according to the present invention will be described with reference to FIG. 4 and process diagrams (No. 1) and (No. 2) of FIG. 5. The manufacturing method of the recording medium manufacturing master according to the present invention is not limited to this example.

Figure 4A:
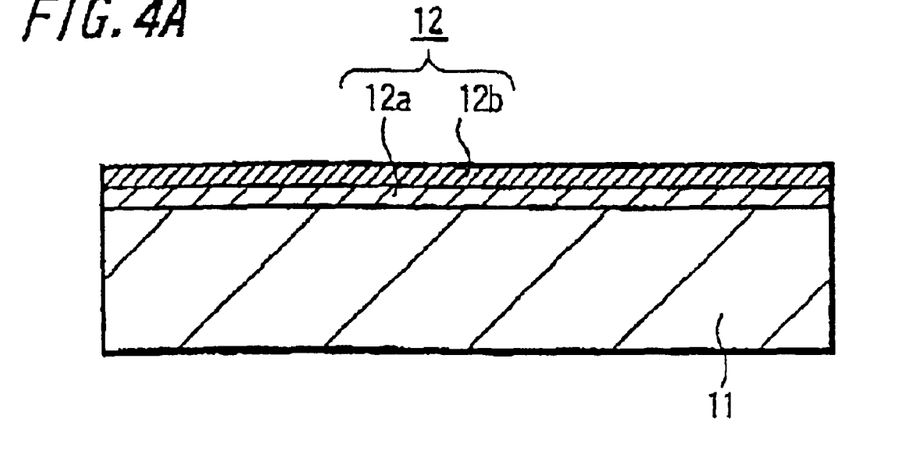
FIGS. 4A and 4B are process diagrams of examples of a recording medium and a method of manufacturing a recording medium manufacturing a master according to the present invention (No. 1).

As shown in FIG. 4A, there is prepared a disk-like substrate 1, for example, in which a $SiO_2$ layer (not shown) is formed on a substrate comprising a recording medium, e.g., glass substrate. A thermosensitive material layer 12 is formed on the surface of the $SiO_2$ layer. This thermosensitive material layer 12 has a film arrangement in which it is denatured, i.e., a characteristic is changed due to a temperature rise caused by laser light.

In this example, the thermosensitive material layer 12 is formed as a laminated structure of first and second material layers 12a and 12b.

The first and second materials 12a and 12b have the material arrangement in which denatured portions are formed when they are mutually diffused or dissolved, e.g., alloyed due to a temperature rise caused by irradiation of laser light. At the same time, the material of this denatured portion is selected in such a manner that a difference of dissolution rate occurs relative to a developer (dissolution solution) used in a development treatment process, which will be described later on, between it and a portion which is not denatured.

Combinations of the material layers of the first and second material layers 12a and 12b are Al and Cu, Al and Ge, or the like.

Figure 4B:
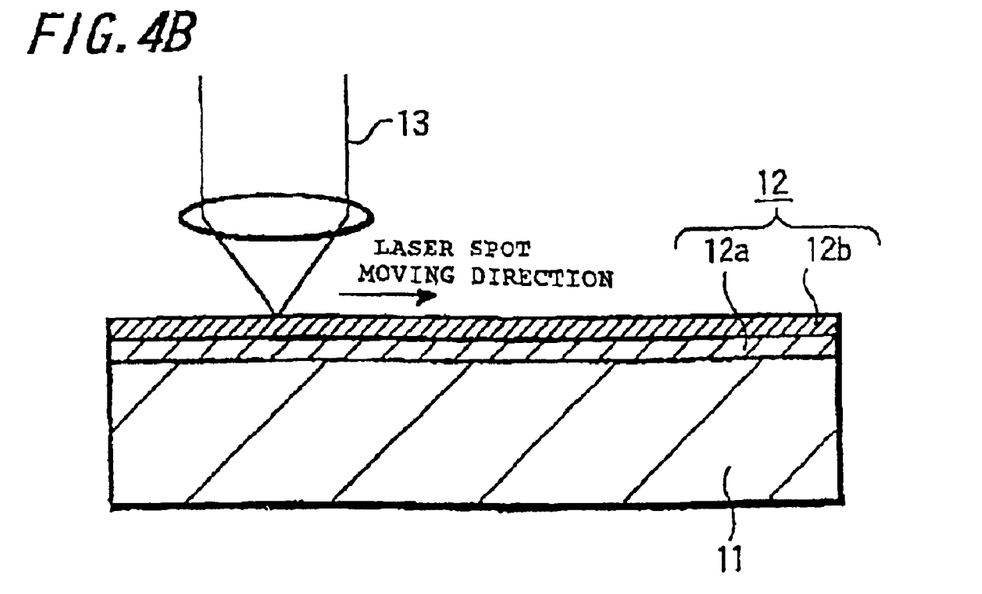

Relative to this thermosensitive material layer 12, as shown in FIG. 4B, a laser spot of laser light 13 is relatively moved on the disk-like substrate 11, for example, in a predetermined direction along circles or spirals when the substrate 11, for example, is rotated and laser spot is moved in the radius direction of the substrate 11 as shown by arrows in this sheet of drawing. Then, with this relative movement, as earlier noted with reference to FIG. 3, for example, laser light is irradiated with a pattern corresponding to target data pattern. At the same time, a temperature rising potion of a predetermined pattern is formed on the thermosensitive material layer 12 by irradiation of laser light whose power is changed by a frequency higher than that of this data pattern, e.g., modulation by a high frequency shown in FIG. 3B or 3C, for example. In this temperature rising portion, the first and second material layers 12a and 12b of the thermosensitive material layer 12 are mutually alloyed and thereby a denatured portion 12s corresponding to target very small concave and convex patterns is formed.

Figure 5A:
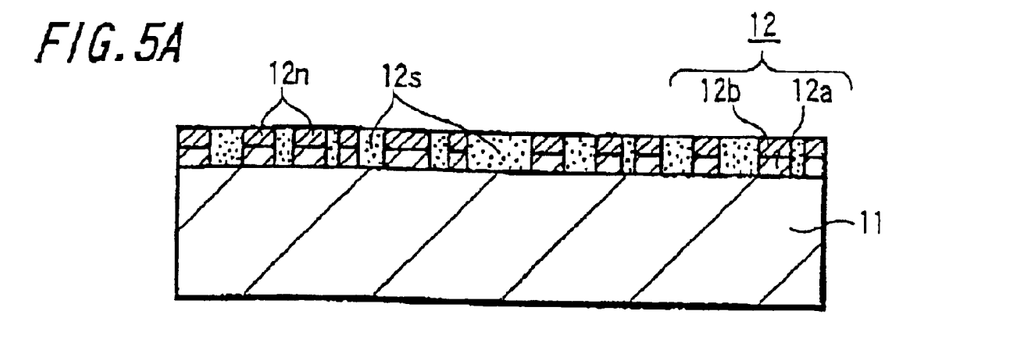
FIGS. 5A to 5D are process diagrams of examples of a recording medium and a method of manufacturing a recording medium manufacturing a master according to the present invention (No. 2).

In this manner, as shown in FIG. 5A, the denatured portion 12s formed by alloying the material layers and a non-denatured portion of other portion which is not alloyed are formed on the thermosensitive material layer 12.

Figure 5B:
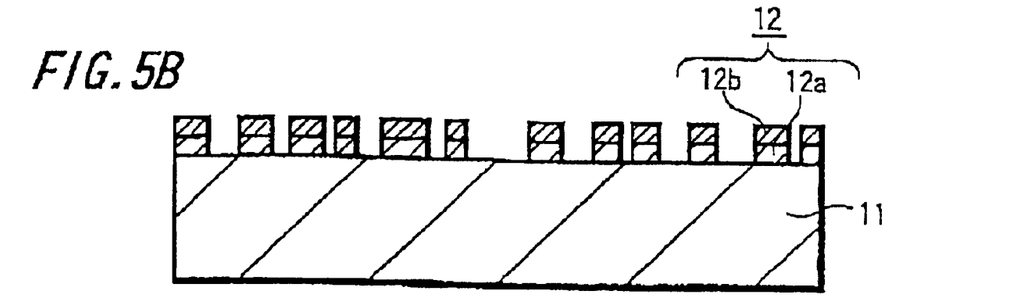

Thereafter, the denatured portion 12s is removed, i.e., selectively etched by developing the thermosensitive material layer 12 as shown in FIG. 5B.

As this developer, i.e., etchant of this denatured portion, there may be used tetramethyl ammonium hydrooxide aqueous solution of approximately 1 to 3%, for example. When the thermosensitive material layer is immersed into this aqueous solution, the denatured portion 12 formed by alloying can be removed by selectively etching, whereby the thermosensitive material layer 12 can be patterned.

Figure 5C:
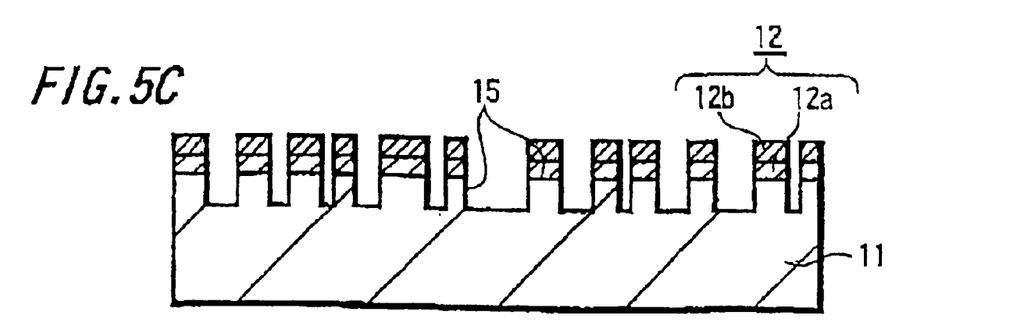

Then, in this example, as shown in FIG. 5C, while the thermosensitive material layer 12 with the very small pattern is being used as an etching mask, very small concavities and convexities 15 are formed by etching the substrate 1, e.g., the $SiO_1$ layer on the surface of the substrate.

In this etching, the very small concavities and convexities 15 whose concave and convex cross-sections are rich in perpendicularlity can be formed by an RIE (reactive ion etching) based on anisotropy etching.

A difference of undulations (depths) of the very small concavities and convexities 15 can freely be selected by selecting the $SiO_2$ layer of the surface layer of the substrate, for example. In some cases, if an underlayer substrate under the $SiO_1$ surface layer is used as an etching stopper, the depth of the very small concavities and convexities 15 can be prescribed by the thickness of the $SiO_2$ surface layer.

Thereafter, the thermosensitive material layer 12 is sequentially immersed into respective solutions of the second and second material layers 12b and 12a and thereby these material layers are removed.

Figure 5D:
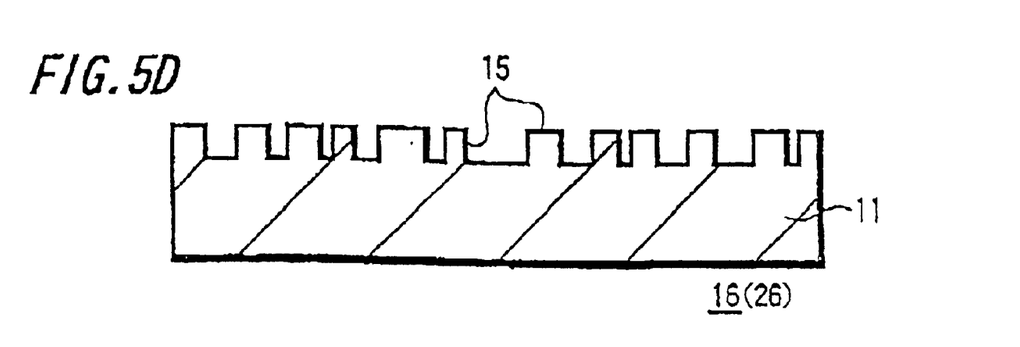

In this manner, as shown in FIG. 5D, the very small concavities and convexities 15 are formed on the surface of the substrate 11.

Thereafter, the thermosensitive material layer 12 is dissolved and removed and a reflection film, a protection film and, in some cases, various recording layers, e.g., recording layer such as a magnetic layer and a phase change material layer are formed on the substrate 11 in which the very small concavities and convexities 15 are formed and thereby a target recording medium 16, e.g., an optical disk, a magneto-optical disk, an optical phase change disk and the like can be obtained.

Like the above method, when tetramethyl ammonium hydroxide aqueous solution is used in the development treatment, i.e, the selective etching after laser light had been irradiated on the thermosensitive material layer 12, in the conventional method using the ordinary photosensitive material layer, a work becomes a similar work used in a master manufacturing method using a novolac resin. There is an advantage that apparatus and processes that had been used in the conventional processes can be utilized as they are.

While the denatured portion made with laser light irradiation is removed as the thermosensitive material layer 12 by development, i.e., selective etching in the above example, there can be used other method which removes other portions than the denatured portion.

In this case, the thermosensitive material layer 12 can be constructed by a combination of Ge and Al, a combination of Si and Al, a combination of Ge and Au or the like, for example, and the first and second materials of the non-denatured portion can be removed by mixed solution of phosphoric acid, water and glycerin and mixed solution of tartaric acid solvent and hydrogen peroxide acid.

The denatured portion of the thermosensitive material layer 12 can be formed based on phase change phenomenon, heat oxidation phenomenon or the like. This denatured portion is not limited to a multilayer structure and may be formed as a single-layer structure of metal which can form the denatured portion 12s by heat oxidation phenomenon, for example, titanium, tantalum or the like. In this case, the denatured portion is denatured by reacting it with oxygen in the air by irradiation of laser light.

As described above, according to the present invention, since the multilayer or single layer thermosensitive material layer can be made of inorganic material, these multilayer or single layer thermosensitive material layer can be deposited by sputtering or vapor deposition, and the like, the respective portions can be formed to have a uniform thin film thickness as compared with the case in which a layer is deposited by spin coating when the photosensitive material layer is used in the conventional ordinary method.

Therefore, very small concavities and convexities such as very small recording marks can be formed with high reliability.

Further, as mentioned before, when the very small concavities and convexities 15 are formed by etching the substrate 11 according to the RIE while the patterned thermosensitive material layer 12 is being used as a mask, it is possible to avoid a disadvantage in which depths and shapes of very small concavities and convexities are dependent on the thickness and the shape of cross-section of the thermosensitive material layer 12 like the case in which very small concavities and convexities are formed by the thermosensitive material layer 12 itself.

Next, a method of manufacturing a master according to an embodiment of the present invention will be described. This master manufacturing method can adopt methods similar to those described in FIGS. 4 and 5. In this master manufacturing method, the substrate 11 is constructed by a substrate comprising a master. However, also in this case, there can be used the above $SiO_1$ substrate.

Then, a master 26 thus manufactured shown in FIG. 5D may be used as a stamper. This master 26 may be produced as a master for inverting and duplicating a stamper. Further, this master 26 may be produced as a mother master for inverting and duplicating a master.

Then, with the stamper thus obtained, a recording medium substrate having target very small concavities and convexities is formed by injection molding, 2P method or the like. Then, a reflection film, a protection film, in some cases, various recording layers and the like are deposited on the recording medium substrate similarly to the aforementioned recording medium manufacturing method, whereby target optical disk; magneto-optical disk, phase-change disk and the like, for example, can be obtained.

Figure 6:
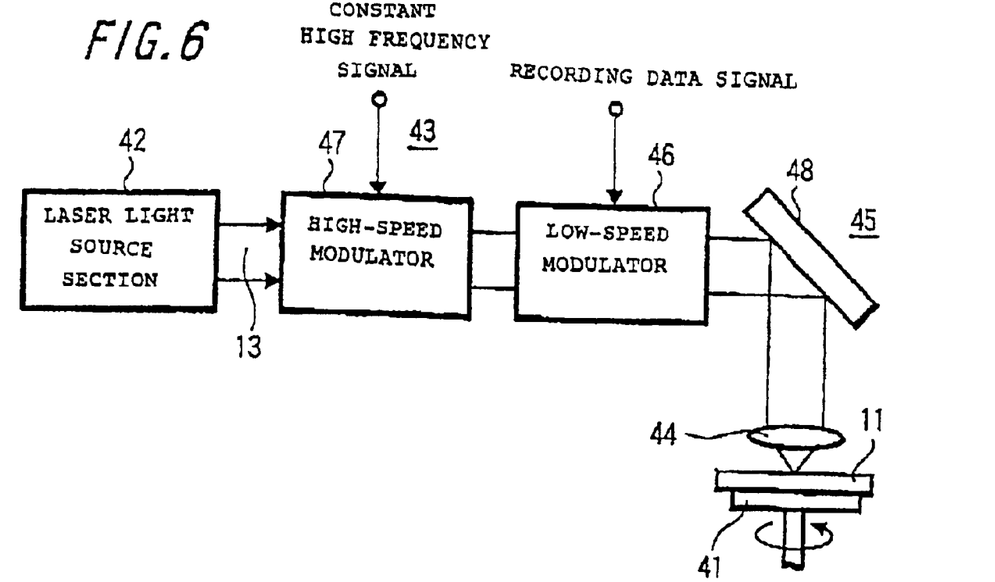
FIG. 6 is a diagram of an example of a recording medium and a method of manufacturing a recording medium manufacturing a master according to the present invention.

Further, a recording medium manufacturing apparatus according to the present invention is comprised of, as FIG. 6 shows a schematic arrangement of its one example, a holding means 41 for holding a disk-like substrate 11 comprising a recording medium in which a thermosensitive material layer (not shown) is deposited, a laser light source section 42, a modulating means for modulating laser light 13 from this laser light source section 42 and which modulates laser light by a frequency higher than a period of the very small concave and convex patterns, an optical system 45 including a condenser lens 44 for focusing laser light on the thermosensitive material layer and a moving means for moving irradiation position of laser light relative to the thermosensitive material layer.

The laser light source section 42 may not be limited to a semiconductor laser, for example, and may include a laser such as an Ar gas laser or the like and further include a wavelength modulator, for example, to output laser light having short wavelength. In this case, as shown in FIG. 6, a low-speed modulator 46 and a high-speed modulator 47 are provided in the optical path in which the laser light 13 emitted from the laser light source section 42 is directed by the optical system 45 toward the substrate 11.

The low-speed modulator 46 modulates the laser light 13 by the recording data signal described with reference to FIG. 3 and the high-speed modulator 47 modulates laser light by the constant high-frequency signal described with reference to FIG. 3.

As this low-speed modulator 47, there can be used various kinds of conventional modulators, e.g., modulator using electrooptic (EO) effect, acoustooptic (AO) effect and various kinds of effects.

Further, as the high-speed modulator 47, there can be used a conventional modulator.

As described above, the laser light 13 emitted from the laser light source section 42 is modulated by the high-speed modulator 47, the low-speed modulator 46 and focused and irradiated on the thermosensitive material layer on the substrate 11 by the optical system 45 having the mirror 47, the condenser lens system 44 and the like. At that time, in order that the laser light 13 is relatively moved relative to the thermosensitive material layer so as to scan the substrate 11, as the moving means, the holding means 41 of the substrate 11, for example, is rotated. On the other hand, the optical system is moved in the radius direction of the substrate 11, whereby the laser light 13 scans the thermosensitive material layer on the substrate 11 circularly or spirally with concentric circles. Then, the denatured portion of the predetermined pattern is formed by modulation of the above laser light.

Figure 7:
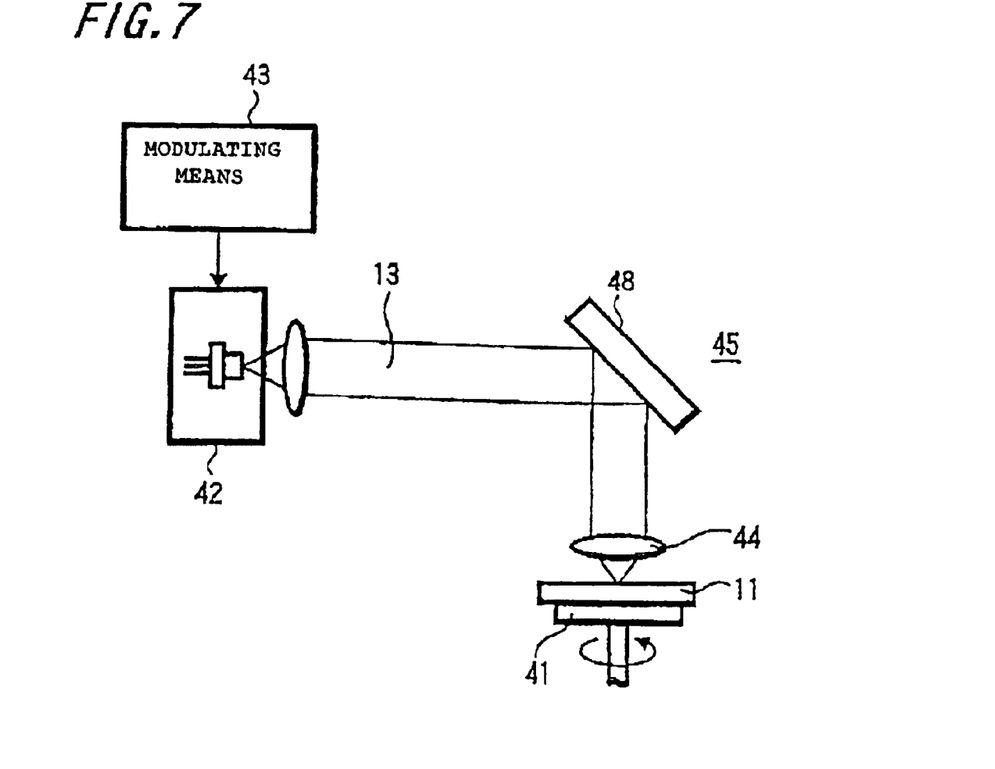
FIG. 7 is a diagram of another example of a recording medium and a method of manufacturing a recording medium manufacturing a master according to the present invention.

In the example in which FIG. 7 shows a schematic diagram, the laser light source section 42 is comprised of a semiconductor laser. In FIG. 7, elements and parts identical to those of FIG. 6 are denoted by identical reference numerals and therefore need not be described. The modulating means 43 in this case is adapted to modulate a current supplied to the semiconductor laser by the above recording data signal and constant high-frequency signal.

After laser light had been irradiated on the thermosensitive material layer by the above apparatus of the present invention, in accordance with the aforementioned method of the present invention, there is obtained a recording medium having target very small concavities and convexities by developing and etching the thermosensitive material layer and the like.

The recording medium manufacturing apparatus and the manufacturing apparatus of the recording medium manufacturing master according to the present invention can be simplified in arrangement so that they can be made compact in size and can be made inexpensive.

In particular, according to the arrangement shown in FIG. 7, they can be made more compact and more simple by using a semiconductor laser. At the same time they can be made inexpensive, time and labor for maintenance can be reduced considerably.

Also in this case, when a short-wavelength laser such as a GaN-based laser is used as a semiconductor laser, smaller concavities and convexities can be formed and the recording medium can be made higher in density.

As described above, according to the present invention, there can be obtained the recording medium having very small concavities and convexities, e.g., a read-only optical disk, a rewritable optical disk, a chase change type optical disk, a magneto-optical disk and a magnetic disk. Further, the present invention is not limited to a so-called disk-like disk and can be applied to the case in which a recording medium of other shape, e.g., card-like recording medium can be obtained.

Specifically, according to the present invention, very small concavities and convexities in the recording medium that is formed finally are not limited to so-called pits and can be applied to various arrangements such as grooves.

As described above, according to the recording medium and the manufacturing method of the recording medium manufacturing master of the present invention, the thermosensitive material layer is used instead of the ordinary photosensitive material unlike the prior art, the thermally denatured portion is formed on the thermosensitive material layer by irradiating laser light on the thermosensitive material layer and this denatured portion or the non-denatured portion is removed by development and thereby patterned. Since the denatured portion can be formed in the heated area of the width narrower than the laser light spot, the very small concavities and convexities thus formed by the above method can be formed as very small patterns less than the optical limit of the laser light spot.

Therefore, there can be constructed a recording medium having high recording density and high resolution.

Then, laser light is irradiated on the thermosensitive material layer at the same time laser light is modulated by the recording data signal, for example. In particular, according to the present invention, laser light is modulated by a constant high frequency signal higher than the frequency of the recording data signal. Thus, the pattern of the denatured portion in the thermosensitive material layer can effectively be avoided from being widened at the rear side as laser light is moved when a temperature rises due to the irradiation of laser light when the long pattern is formed.

Therefore, the pattern of the denatured portion in the thermosensitive material layer can be reliably formed as the target pattern independently of the length of the pattern. Finally, there can be manufactured a recording medium, having a high recording density and a high resolution.

According to the recording medium and the manufacturing apparatus of the recording medium manufacturing master of the present invention, since a highly vacuum chamber need not be provided, the apparatus can be made simple, compact and inexpensive. Further, there can be constructed the apparatus whose maintenance can be made simple.

What is claimed is:

1. In a method of manufacturing a recording medium manufacturing master for manufacturing a recording medium having very small concavities and convexities which correspond to recording marks or grooves, said recording medium manufacturing master manufacturing method comprising the steps of:

a process for forming a thermosensitive inorganic material layer on a substrate constituting a master;

a process for forming denatured portions of patterns corresponding to said very small concavities and convexities on said thermosensitive inorganic material layer by irradiating laser light on said thermosensitive inorganic material layer with patterns of said very small concavities and convexities; and a process for patterning said thermosensitive inorganic material layer by developing said thermosensitive inorganic material layer, wherein said laser light pattern irradiation is laser light irradiation modulated to a frequency higher than a period of said very small concavities and convexities and said denatured portion is removed in said process for patterning by development.

2. A recording medium manufacturing master manufacturing method according to claim 1, wherein said thermosensitive inorganic material layer has a laminated structure comprised of first and second material layers made of materials different from each other and said denatured portions based on mixture or reaction of materials of at least said first and second material layers are formed by mutually diffusing or dissolving materials of at least said first and second material layers due to diffusion or dissolution caused as a temperature is raised by said laser light irradiation.

3. A recording medium manufacturing master manufacturing method according to claim 1 or 2, wherein said laser light is semiconductor laser light.

4. A recording medium manufacturing master manufacturing method according to claim 1 or 2, wherein said laser light is blue violet laser light.

5. A recording medium manufacturing master manufacturing method according to claim 1, wherein said very small concavities and convexities are formed in said substrate while said patterned thermosensitive inorganic material layer is being used as a mask.

6. A recording medium manufacturing master manufacturing method according to claim 1, wherein said very small concavities and convexities are formed in said substrate by reactive ion etching while said patterned thermosensitive inorganic material layer is being used as a mask.

7. A recording medium manufacturing master manufacturing method according to claim 1, wherein said thermosensitive material layer is developed in said pattern process by tetramethyl ammonium hydrooxide aqueous solution.

* * * * *

UNITED STATES PATENT AND TRADEMARK OFFICE
CERTIFICATE OF CORRECTION

PATENT NO. : 6,773,868 B2
APPLICATION NO. : 09/959646
DATED : August 10, 2004
INVENTOR(S) : Koichiro Kishima It is certified that error appears in the above-identified patent and that said Letters Patent is hereby corrected as shown below:

Title Page:

The Title (54) should read:

-- METHOD OF MANUFACTURING RECORDING MEDIUM, METHOD OF MANUFACTURING RECORDING MEDIUM MANUFACTURING MASTER, APPARATUS FOR MANUFACTURING RECORDING MEDIUM MANUFACTURING MASTER --.

Signed and Sealed this

Thirteenth Day of March, 2007

JON W. DUDAS
*Director of the United States Patent and Trademark Office*

UNITED STATES PATENT AND TRADEMARK OFFICE
CERTIFICATE OF CORRECTION

PATENT NO. : 6,773,868 B2  Page 1 of 1
APPLICATION NO. : 09/959646
DATED : August 10, 2004
INVENTOR(S) : Koichiro Kishima It is certified that error appears in the above-identified patent and that said Letters Patent is hereby corrected as shown below:

Title Page:

The Title (54) should read:

-- METHOD OF MANUFACTURING RECORDING MEDIUM, METHOD OF MANUFACTURING RECORDING MEDIUM MANUFACTURING MASTER, APPARATUS FOR MANUFACTURING RECORDING MEDIUM MANUFACTURING MASTER --.

Signed and Sealed this

Twenty-seventh Day of March, 2007

JON W. DUDAS
*Director of the United States Patent and Trademark Office*